US012573928B2

(12) United States Patent
Hatano et al.

(10) Patent No.:  US 12,573,928 B2
(45) Date of Patent:     Mar. 10, 2026

(54) ACTUATOR WITH COIL POSITIONING STRUCTURE

(71) Applicant: NIDEC SANKYO CORPORATION, Nagano (JP)

(72) Inventors: Shinji Hatano, Nagano (JP); Masao Tsuchihashi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 918 days.

(21) Appl. No.: 17/857,181

(22) Filed: Jul. 5, 2022

(65) Prior Publication Data

US 2023/0008952 A1     Jan. 12, 2023

(30) Foreign Application Priority Data

Jul. 8, 2021     (JP) ................................. 2021-113374

(51) Int. Cl.
H02K 33/02          (2006.01)
B06B 1/04           (2006.01)

(52) U.S. Cl.
CPC ............. H02K 33/02 (2013.01); B06B 1/045 (2013.01)

(58) Field of Classification Search
CPC ...... H02K 33/02; H02K 33/16; H02K 7/1023; H02K 7/10; H02K 5/04; B06B 1/045
See application file for complete search history.

(56) References Cited

U.S. PATENT DOCUMENTS

| | | | |
|---|---|---|---|
| 6,495,934 B1 | 12/2002 | Hayashi et al. | |
| 2019/0190365 A1* | 6/2019 | Takeda ................... | H02K 33/18 |
| 2019/0305659 A1* | 10/2019 | Kitahara ............... | H02K 33/18 |
| 2019/0305660 A1 | 10/2019 | Tsuchihashi et al. | |
| 2023/0012117 A1 | 1/2023 | Hatano et al. | |

FOREIGN PATENT DOCUMENTS

| | | | |
|---|---|---|---|
| CN | 110323911 | 10/2019 | |
| CN | 115603506 | 1/2023 | |
| JP | 2008059625 | 3/2008 | |
| JP | 2019180148 | 10/2019 | |
| JP | 2019180150 A * | 10/2019 | ............ H02K 33/16 |
| JP | 2020089219 | 6/2020 | |

(Continued)

OTHER PUBLICATIONS

Machine translation to English for JP 2019-18015A, Mori et al., "Actuator and Method for Manufacturing the same". (Year: 2019).*

(Continued)

*Primary Examiner* — Emily P Pham
(74) *Attorney, Agent, or Firm* — JCIPRNET

(57)          ABSTRACT

An actuator includes a movable body, a support body provided with a case that houses the movable body and a coil assembly, a first connecting body and a second connecting body to be connected to the movable body and the support body, and a magnetic drive circuit that vibrates the movable body with respect to the support body in an X direction. The coil assembly includes a first plate that overlaps the coil from a Z1 direction, and a second plate that overlaps the coil from a Z2 direction. The first plate includes a notch portion that comes into contact with a short side portion of the coil from an outer peripheral side, and positions the coil by the notch portion.

8 Claims, 13 Drawing Sheets

(56)                References Cited

FOREIGN PATENT DOCUMENTS

| JP | 2020102901 | 7/2020 | |
| WO | 9946848 | 9/1999 | |
| WO | WO-2021117377 A1 * | 6/2021 | ............... B06B 1/04 |

OTHER PUBLICATIONS

Machine translation to English for WO 2021/117377, Ogihara et al. "Vibration Generation Device". (Year: 2021).*
"Office Action of China Counterpart Application", issued on Oct. 12, 2025, with English translation thereof, p. 1-p. 16.

* cited by examiner

ACTUATOR WITH COIL POSITIONING STRUCTURE

CROSS REFERENCE TO RELATED APPLICATIONS

The present invention claims priority under 35 U.S.C. § 119 to Japanese Application No. 2021-113374 filed on Jul. 8, 2021, the entire content of which is incorporated herein by reference.

FIELD OF THE INVENTION

At least an embodiment of the disclosure relates to an actuator that vibrates a movable body.

BACKGROUND

A conventional actuator includes a movable body provided with a magnet, and a support body provided with a coil, wherein the movable body is vibrated with respect to the support body by applying drive current to the coil. This type of actuator uses an elastic member or a viscoelastic member, as a connecting body that connects the support body and the movable body. When the movable body is vibrated, a reaction force associated with vibration of the movable body is applied to the support body via the connecting body. Consequently, a user who touches the support body can feel the vibration.

In the above actuator, the support body includes a coil holder made of resin. The coil is an air-core coil, and is disposed in a coil placement hole formed in a plate portion of the coil holder. The coil faces a magnet to be fixed to a first yoke facing the plate portion from one side, and a magnet fixed to a second yoke facing the plate portion from the other side. A metal plate overlapping the coil placement hole and the coil is fixed to the coil holder. The plate prevents the coil and the magnet from coming into contact with each other, when the movable body is vibrated.

In the above actuator, since the coil holder is made of resin, it is possible to form the coil placement hole of a shape in which the coil fits, and the coil is positioned by fitting the coil into the coil placement hole. However, a resin component needs to secure a thickness of each portion in order to secure strength. Therefore, in a case where an outer size of the actuator cannot be made large, there is a limit in making the dimensions of the coil large. If the coil cannot be made large, it is not possible to increase an acceleration of the movable body, and generate large vibrations.

In addition, in a structure as described above in which a coil is fixed to a resin component, and a plate is fixed from both sides, the number of components is large, and the number of assembly processes is large.

In view of the above, it has been proposed to directly fix a coil to a metal plate, which has been conventionally fixed to a resin coil holder, instead of using a resin coil holder. However, if the resin coil holder is eliminated, a structure for positioning the coil also disappears. Therefore, a structure for positioning the coil via a plate is necessary.

SUMMARY

An actuator according to an exemplary embodiment of the disclosure includes a movable body; a support body including a case that houses the movable body; a connecting body to be connected to the movable body and the support body; and a magnetic drive circuit including a coil and a magnet facing the coil in a first direction, and vibrating the movable body with respect to the support body in a second direction intersecting the first direction. The support body includes a metal first plate that overlaps the coil from one side in the first direction, and the coil is fixed to the case via the first plate. The coil is an air-core coil including a pair of long side portions aligned in the second direction and a pair of short side portions that connect the pair of long side portions. The first plate includes a positioning portion that positions the coil in a direction intersecting the first direction by coming into contact with the coil from an outer peripheral side.

The above and other elements, features, steps, characteristics and advantages of the present disclosure will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

In the following, an embodiment of an actuator to which at least an embodiment of the disclosure is applied is described with reference to the drawings.

Figure 1A:
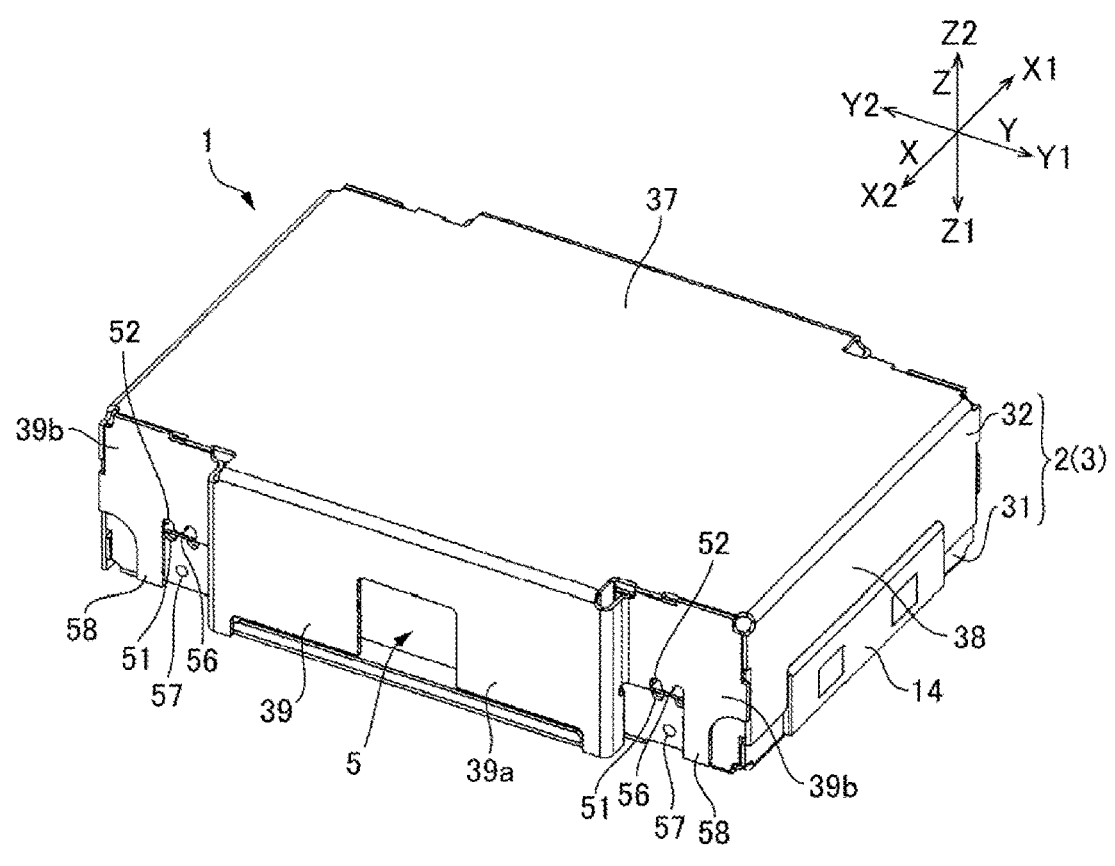
FIGS. 1A and 1B are perspective views of an actuator to which at least an embodiment of the disclosure is applied when viewed from a Z2 direction and a Z1 direction.
Figure 1B:
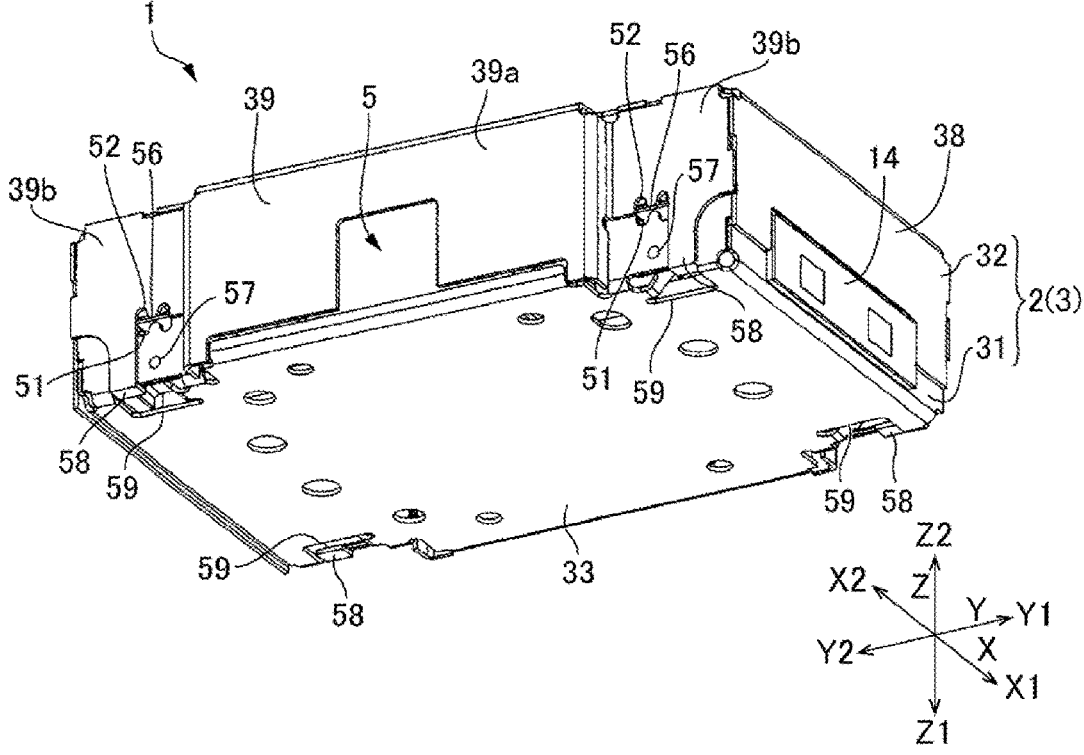
Figure 2:
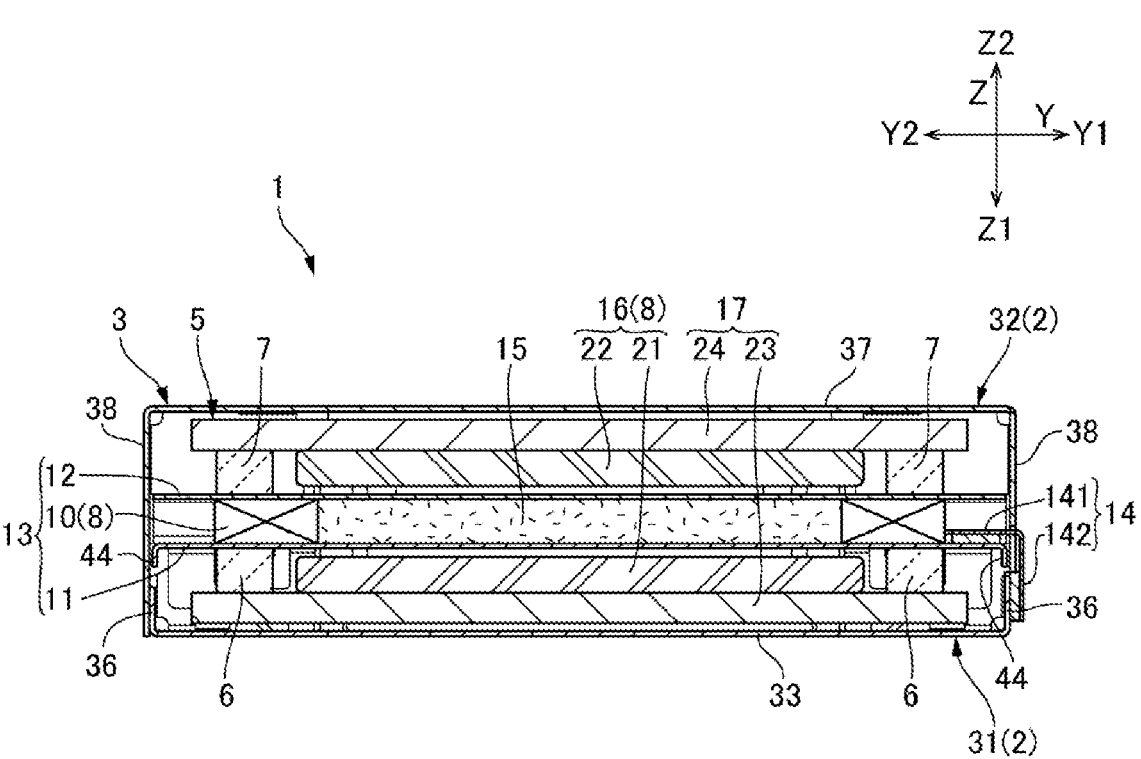
FIG. 2 is a cross-sectional view of the actuator when taken along a longitudinal direction.
Figure 3:
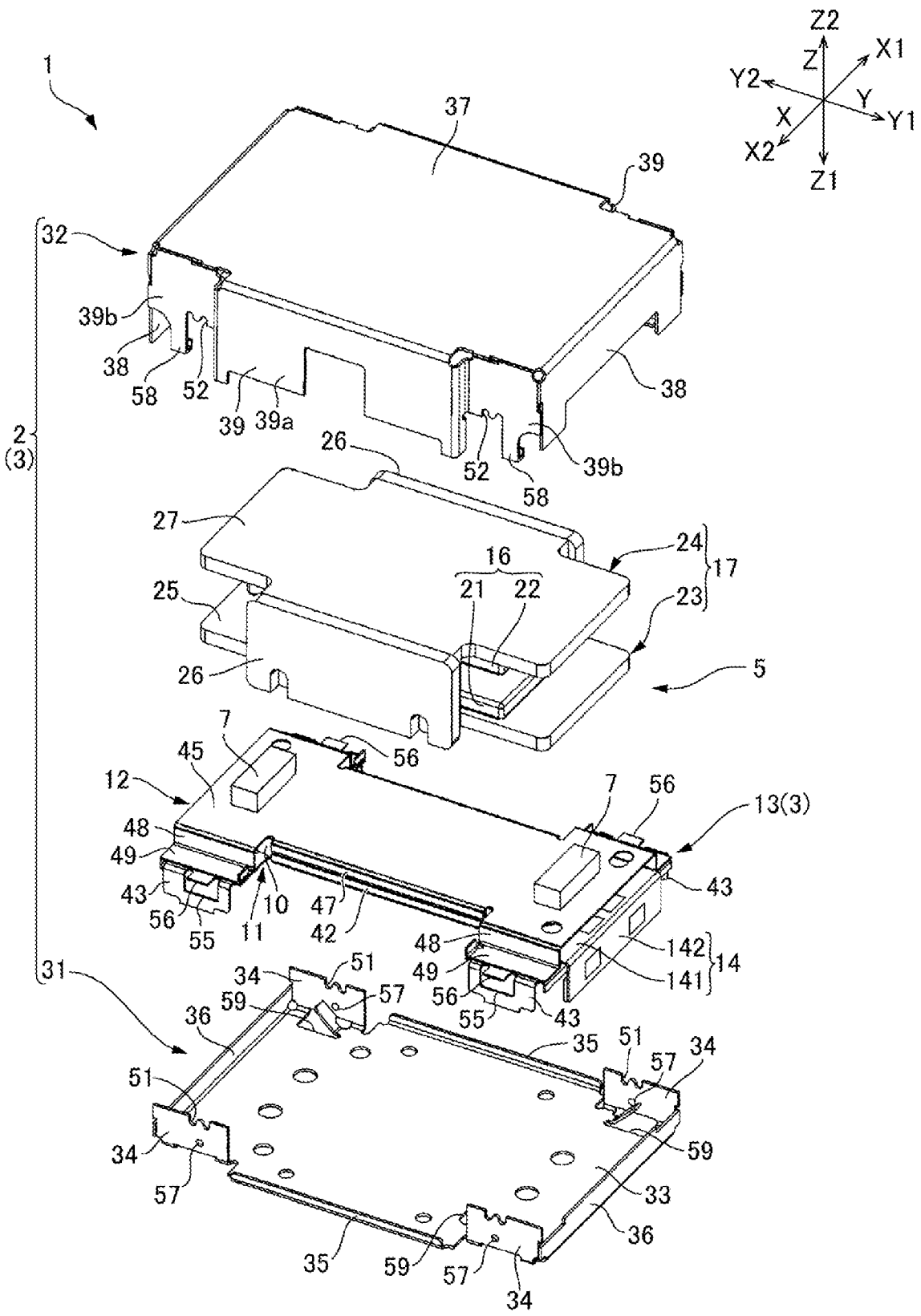
FIG. 3 is an exploded perspective view of the actuator when viewed from the Z2 direction.
Figure 4:
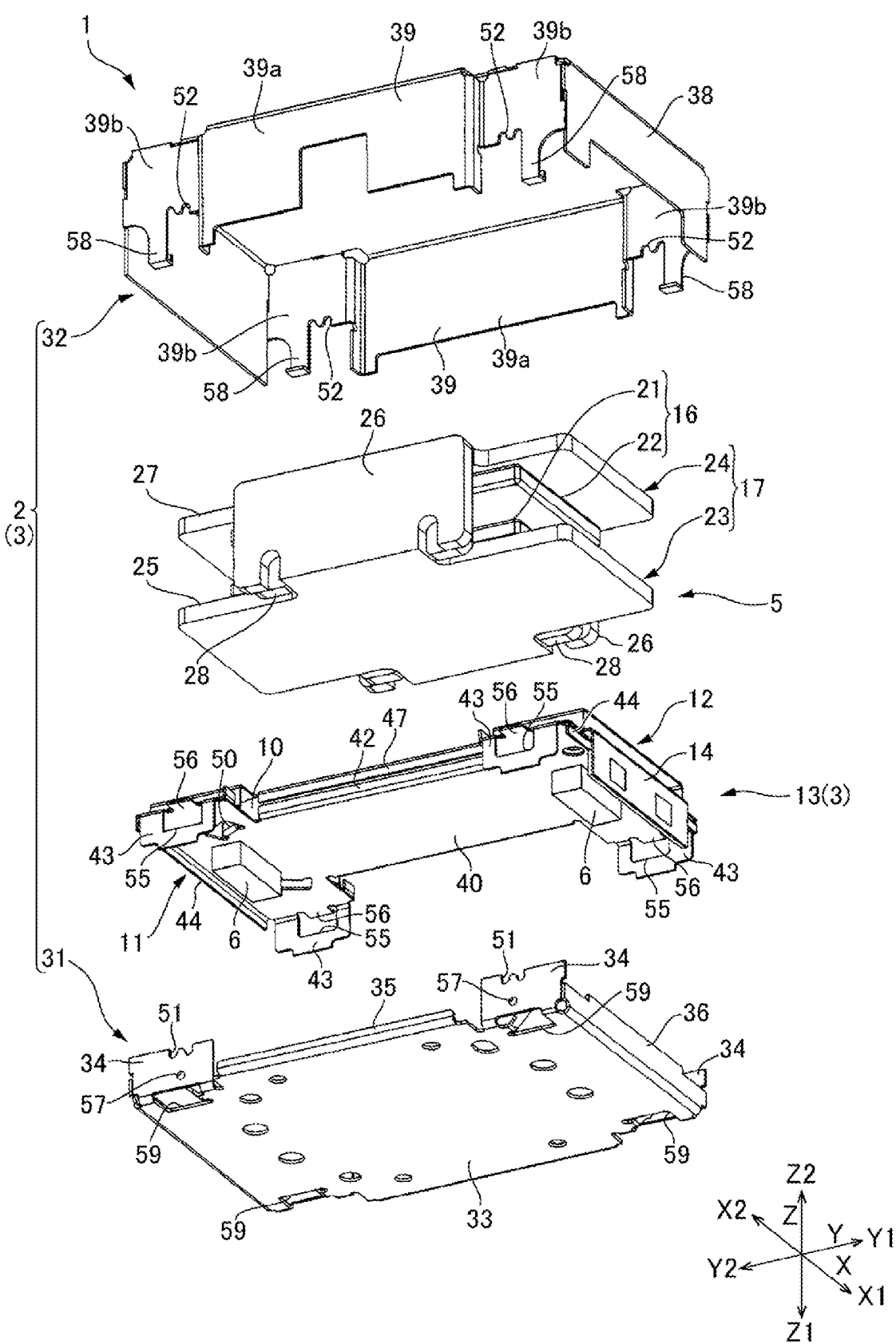
FIG. 4 is an exploded perspective view of the actuator when viewed from the Z1 direction.
Figure 5:
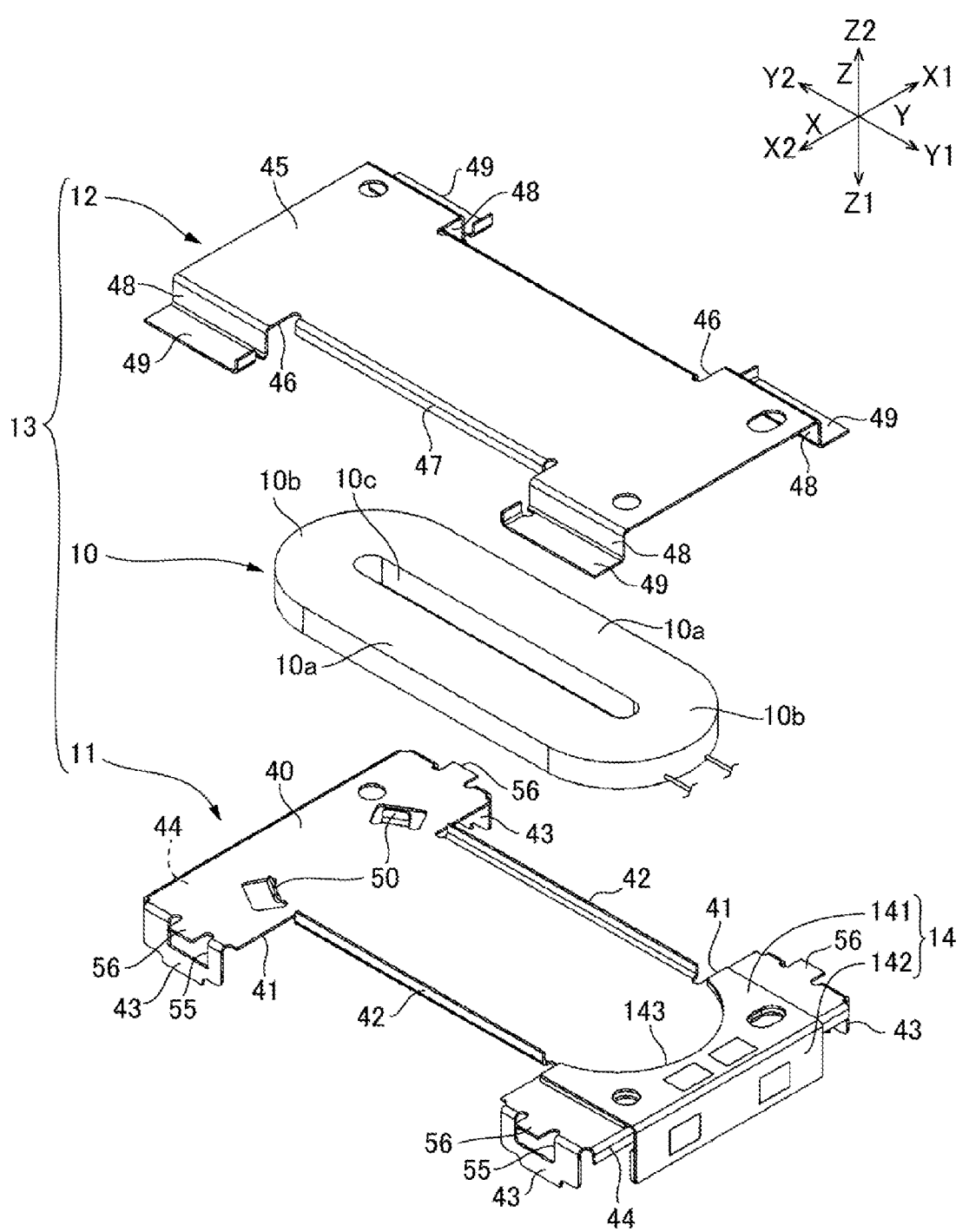
FIG. 5 is an exploded perspective view of a coil assembly.
Figure 6:
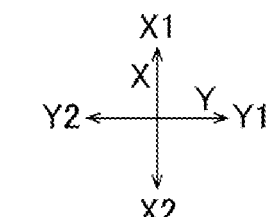
FIG. 6 is a plan view of a first plate and a coil.
Figure 6:
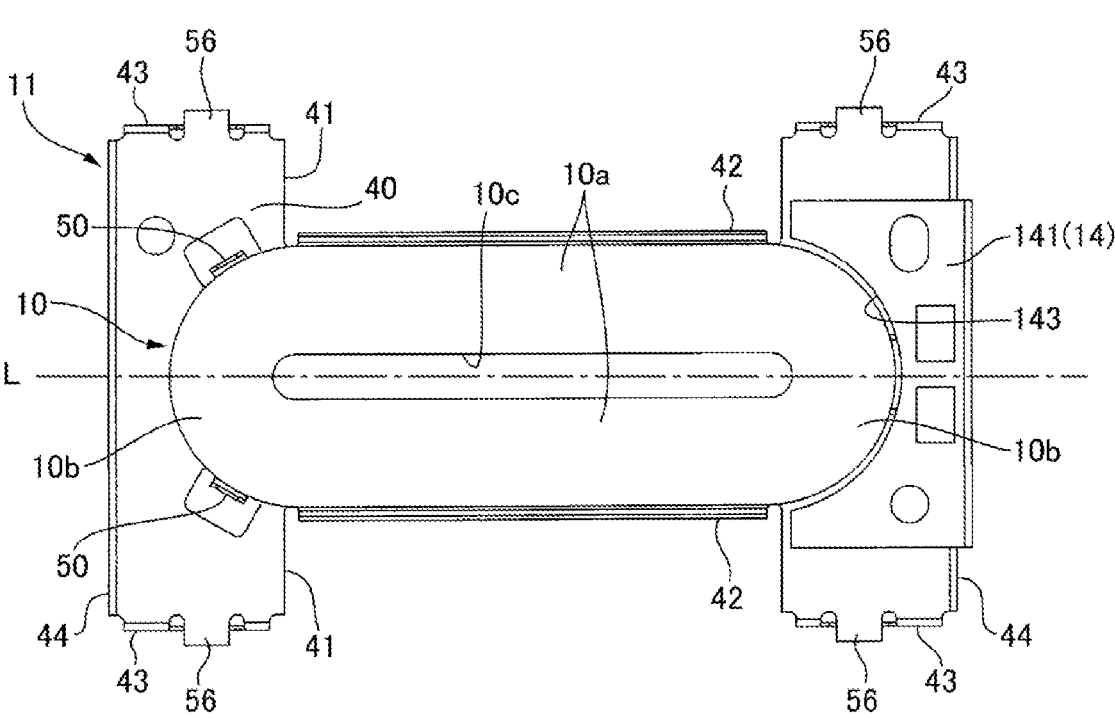
Figure 7:
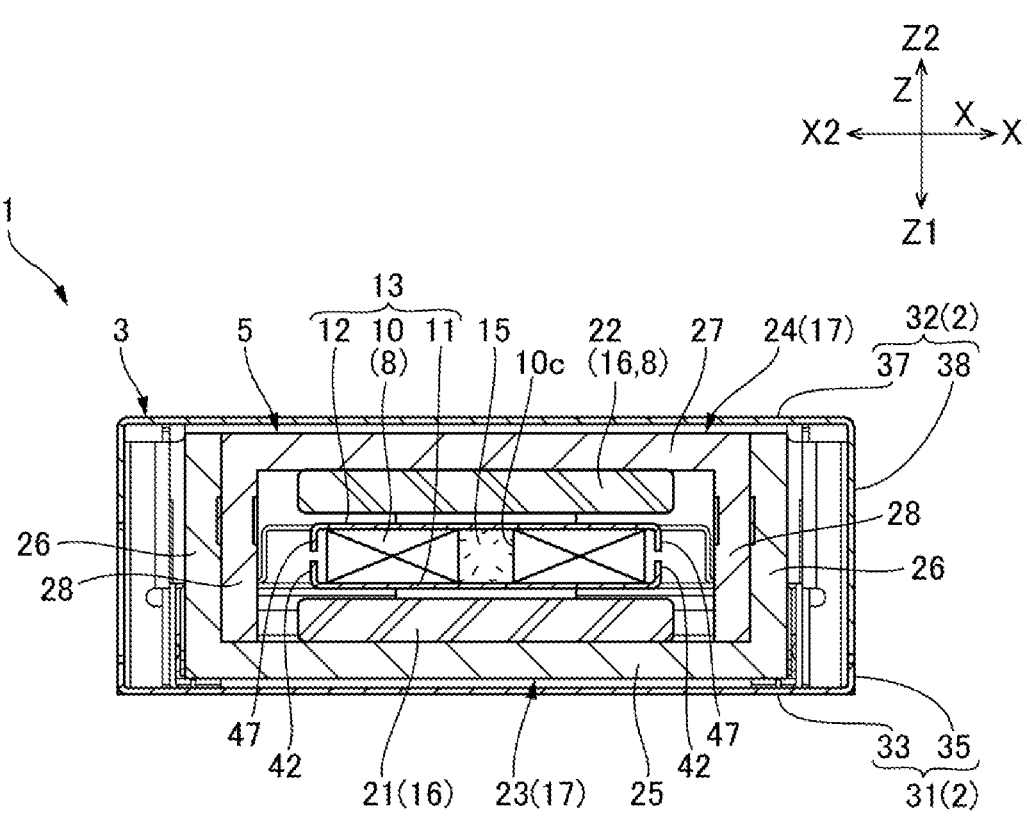
FIG. 7 is a cross-sectional view of the actuator when taken along a direction intersecting the longitudinal direction.
Figure 8:
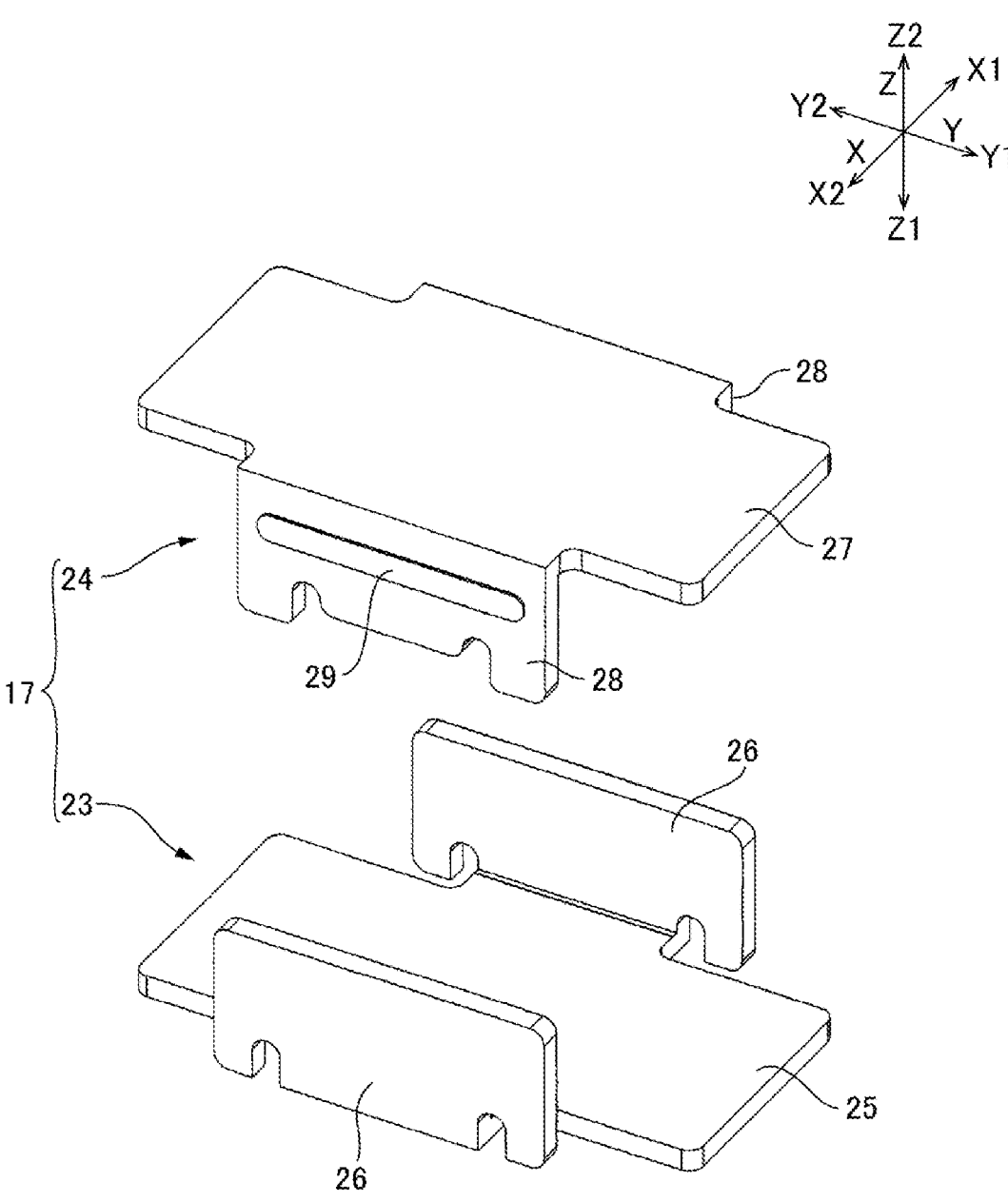
FIG. 8 is an exploded perspective view of a yoke.
Figure 9:
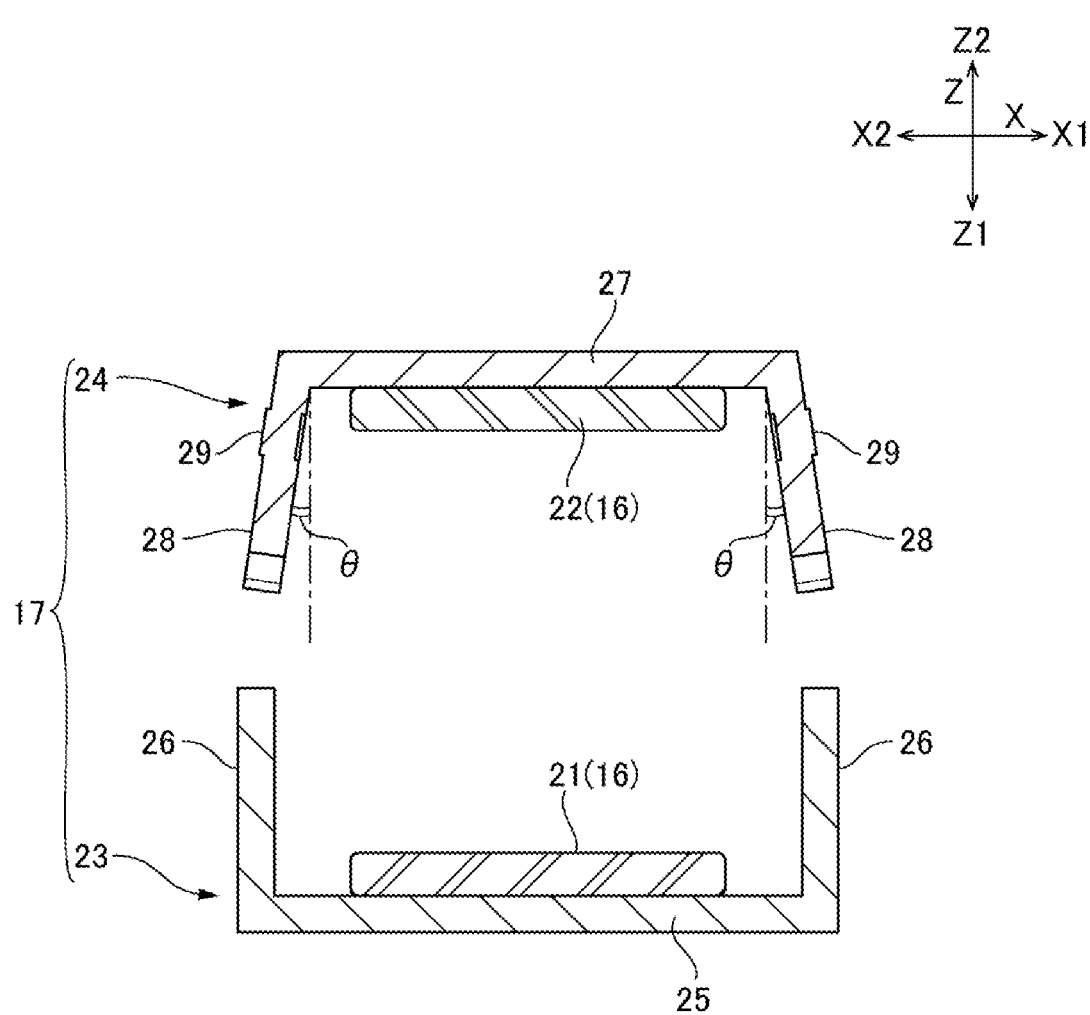
FIG. 9 is a cross-sectional view of the yoke and a magnet.

FIG. 1A is a perspective view of an actuator 1 to which at least an embodiment of the disclosure is applied when viewed from a Z2 direction. FIG. 1B is a perspective view of the actuator 1 to which at least an embodiment of the disclosure is applied when viewed from a Z1 direction. FIG. 2 is a cross-sectional view of the actuator 1 when taken along a longitudinal direction. FIG. 3 is an exploded perspective view of the actuator 1 when viewed from the Z2 direction. FIG. 4 is an exploded perspective view of the actuator 1 when viewed from the Z1 direction. FIG. 5 is an exploded perspective view of a coil assembly 13. FIG. 6 is a plan view of a first plate 11 and a coil 10. FIG. 7 is a cross-sectional view of the actuator 1 when taken along a direction intersecting the longitudinal direction. FIG. 8 is an exploded perspective view of a yoke 17. FIG. 9 is a cross-sectional view of the yoke 17 and a magnet 16.

The actuator 1 is used as a tactile device that transmits information by vibration. As illustrated in FIGS. 1A and 1B, an external shape of the actuator 1 is a rectangular parallelepiped shape. The actuator 1 generates vibrations in a short direction of its external shape. In the following description, the short direction in which vibration is generated is referred to as a X direction (second direction), and a longitudinal direction of the actuator 1, which is orthogonal to the X direction, is referred to as a Y direction (third direction). Further, in the following description, a thickness direction (height direction) of the actuator 1, which is orthogonal to the X direction and the Y direction, is referred to as a Z direction (first direction). The X direction, the Y direction, and the Z direction are orthogonal to one another. Also, one of the X directions is referred to as a X1 direction, and the other direction is referred to as a X2 direction. One of the Y directions is referred to as a Y1 direction, and the other direction is referred to as a Y2 direction. One of the Z directions is referred to as a Z1 direction, and the other direction is referred to as a Z2 direction.

As illustrated in FIGS. 1A to 4, the actuator 1 includes a support body 3 provided with a case 2 that defines an outer shape, and a movable body 5 that is housed inside the case 2. The actuator 1 further includes connecting bodies (a first connecting body 6 and a second connecting body 7) that connect the support body 3 and the movable body 5, and a magnetic drive circuit 8 (see FIGS. 2 and 7) that moves the movable body 5 relative to the support body 3 in the X direction.

As illustrated in FIGS. 2 and 7, the support body 3 includes the coil assembly 13 defined by assembling three members, namely, the coil 10, the first plate 11 that is placed over the coil 10 in the Z1 direction, and a second plate 12 that is placed over the coil 10 in the Z2 direction. As illustrated in FIG. 5, the coil 10 is a flat air-core coil, and its thickness direction is directed in the Z direction. As illustrated in FIGS. 2 and 7, the coil 10 is located at a middle of the case 2 in the Z direction.

The support body 3 further includes a power supply board 14 held at an end of the first plate 11 in the Y1 direction. In the present embodiment, the power supply board 14 is a flexible printed circuit board. Note that, the power supply board 14 may be a rigid substrate. The coil 10 includes two coil wires drawn in the Y1 direction, and the coil wires are connected to a wiring pattern provided on a surface of the power supply board 14. Electric power is supplied to the coil 10 via the power supply board 14.

As illustrated in FIGS. 5 and 6, the coil 10 is an oval-shaped air-core coil extending in the Y direction, and includes a pair of long side portions 10*a* extending in parallel in the Y direction, and a pair of arc-shaped short side portions 10*b* that connect ends of the pair of long side portions 10*a* in the Y direction. A center hole 10*c* extending in the Y direction is provided between the pair of long side portions 10*a*.

The movable body 5 includes the magnet 16 and the yoke 17. As illustrated in FIGS. 2 and 7, the magnet 16 faces the coil 10 in the Z direction. The coil 10 and the magnet 16 constitute the magnetic drive circuit 8. As illustrated in FIGS. 3 and 4, the first connecting body 6 and the second connecting body 7 are each a rectangular-parallelepiped member. Each of the first connecting body 6 and the second connecting body 7 has at least either one of elasticity and viscoelasticity.

As illustrated in FIGS. 2, 3, and 4, the movable body 5 includes, as the magnet 16, a first magnet 21 and a second magnet 22. The first magnet 21 is located in the Z1 direction of the coil 10. The second magnet 22 is located in the Z2 direction of the coil 10. The first magnet 21 and the second magnet 22 are polarized into two parts in the X direction. When the movable body 5 and the support body 3 are assembled, the first magnet 21 faces the long side portion 10*a* of the coil 10 in the Z1 direction, and faces the second magnet 22 in the Z2 direction.

The yoke 17 is made of a magnetic material. As illustrated in FIGS. 3 and 4, the yoke 17 includes a first yoke 23 and a second yoke 24. As illustrated in FIG. 8, the first yoke 23 includes a first flat plate portion 25 extending in the Y direction, and a pair of first connecting plate portions 26 protruding outwardly in the X direction from a middle portion in the Y direction, and extending in the Z2 direction at both end edges of the first flat plate portion 25 in the Y direction. The first magnet 21 is held on a surface of the first flat plate portion 25 in the Z2 direction. The second yoke 24 includes a second flat plate portion 27 facing the first flat plate portion 25 in the Z-direction, and a pair of second connecting plate portions 28 protruding outwardly in the X direction from a middle portion in the Y direction, and extending in the Z1 direction at both end edges of the second flat plate portion 27 in the Y direction. The second magnet 22 is held on a surface of the second flat plate portion 27 in the Z1 direction.

The yoke 17 is integrally assembled by press-fitting the pair of second connecting plate portions 28 of the second yoke 24 into the pair of first connecting portions 26 of the first yoke 23, and jointing the first connecting plate portion 26 and the second connecting plate portion 28 by an adhesive agent. As illustrated in FIGS. 2 and 7, when the movable body 5 is assembled in such a way as to surround the periphery of the coil assembly 13 by the yoke 17, the yoke 17 is assembled in such a way that the first flat plate portion 25 and the first magnet 21 overlap the coil 10 from the Z1 direction, and the second flat plate portion 27 and the second magnet 22 overlap the coil 10 from the Z2 direction. Herein, since the coil assembly 13 includes the first plate 11 that overlaps the coil 10 from the Z1 direction, and the second plate 12 that overlaps the coil 10 from the Z2 direction, it is possible to prevent the first magnet 21 and the second magnet 22 from coming into contact with the coil 10.

As illustrated in FIG. 9, the second yoke 24 before assembly is configured in such a way that the pair of second connecting plate portions 28 extend in a direction inclined in opposite directions from each other, and a gap between the pair of second connecting plate portions 28 slightly increases as extending toward the Z1 direction. Note that, in FIG. 9, to clarify the configuration, an inclination angle θ of each of the second connecting plate portions 28 with respect to the Z direction is illustrated larger than an actual state. As illustrated in FIGS. 8 and 9, each of the pair of second connecting plate portions 28 includes a convex portion 29 protruding from a surface facing outwardly in the X direction. The convex portion 29 extends linearly in the Y direction. In this way, since the second yoke 24 is configured in such a way that a gap between the pair of second connecting plate portions 28 increases at a distal end side, and the convex portion 29 is provided on a surface facing outwardly in the X direction, the second yoke 24 is securely press-fitted when inserted between the pair of first connecting plate portions 26.

As illustrated in FIGS. 1A to 4, the case 2 includes a first case member 31 and a second case member 32 placed over in the Z direction. The first case member 31 is mounted on the coil assembly 13 from the Z1 direction. The second case member 32 is mounted on the coil assembly 13 and the first case member 31 from the Z2 direction.

As illustrated in FIGS. 3 and 4, the first case member 31 includes a substantially rectangular first end plate portion 33, and a first case side plate portion 34 at four locations extending in the Z2 direction from both ends in the Y direction at both side edges of the first end plate portion 33 in the X direction. Therefore, the first case member 31 includes a pair of first case side plate portions 34 facing each other in the X direction at each of an end of the first end plate portion 33 in the Y1 direction and an end of the first end plate portion 33 in the Y2 direction. As will be described later, in the present embodiment, by fitting the first plate 11 into the two sets of first case side plate portions 34 facing each other in the X-direction, the first case member 31 and the coil assembly 13 are assembled. A positioning structure of the coil assembly 13 with respect to the case 2 is described later.

The first case member 31 further includes a pair of first case flexure plate portions 35 bent in the Z2 direction from both side edges in the X direction at a middle portion of the first end plate portion 33 in the Y direction, and a pair of first case flexure plate portions 36 bent in the Z2 direction from both side edges of the first end plate portion 33 in the Y1 direction.

As illustrated in FIGS. 3 and 4, the second case member 32 includes a substantially rectangular second end plate portion 37, a pair of second case side plate portions 38 extending in the Z1 direction from end edges on both sides of the second end plate portion 37 in the Y direction, and a pair of second case side plate portions 39, each of which extends in the Z1 direction from both end peripheries of the second end plate portion 37 in the X direction. The second end plate portion 37 includes a protruding portion protruding toward both sides in the X direction at a middle in the Y direction. Therefore, each of the second case side plate portions 39 includes a side plate middle portion 39a extending in the Z1 direction from a distal end of the protruding portion of the second end plate portion 37, and a side plate end portion 39b provided at a position shifted to the middle side in the X-direction with respect to the side plate middle portion 39a on both sides of the side plate middle portion 39a in the Y direction. Both ends of the side plate middle portion 39a in the Y direction are connected to a step portion bent at a substantially right angle toward the middle of the second case member 32 in the X direction, and the side plate middle portion 39a and the side plate end portion 39b are connected via the step portion.

The second case member 32 includes a hook 58 extending in the Z1 direction from each of the side plate end portions 39b, and a distal end of the hook 58 at four locations is inserted into the first case member 31. A distal end of each of the hooks 58 is engaged with the first plate 11 fitted into the first case member 31. Thus, the first case member 31, the coil assembly 13, and the second case member 32 are assembled into the support body 3. Details of an engagement structure of the hook 58 is described later.

The first plate 11 and the second plate 12 are made of non-magnetic metal. As illustrated in FIG. 5, the first plate 11 includes a first plate portion 40 extending in the Y direction. The power supply board 14 is fixed to an end of the first plate portion 40 in the Y1 direction. The power supply board 14 includes a first substrate portion 141 to be fixed to a surface of the first plate portion 40, and a second substrate portion 142 bent in the Z1 direction at a substantially right angle from an end of the first substrate portion 141 in the Y1 direction, and disposed on a side surface of the case 2 in the Y1 direction.

The first plate portion 40 includes a pair of cutout portions 41, each of which is defined by cutting out a middle portion inwardly in the Y direction at an end edge on both sides in the X direction. The first plate 11 includes a pair of first plate flexure plate portions 42 bent in the Z2 direction from an inner peripheral edge of the pair of cutout portions 41 in the X direction. The first plate 11 further includes, on both sides of each of the cutout portions 41 in the Y direction, a first plate side plate portion 43 at four locations, each of which is bent in the Z1 direction from both ends of the first plate portion 40 in the X direction. The first plate 11 further includes a first plate flexure plate portion 44 bent in the Z1 direction from an end edge of the first plate portion 40 in the Y1 direction, and an end edge of the first plate portion 40 in the Y2 direction.

The second plate 12 includes a second plate portion 45 extending in the Y direction. The second plate portion 45 includes a pair of cutout portions 46, each of which is defined by cutting out a middle portion inwardly in the Y-direction at an end edge on both sides in the X direction. The second plate 12 includes a pair of second plate flexure plate portions 47 bent in the Z1 direction from an inner peripheral edge of the pair of cutout portions 46 in the X direction. The second plate 12 further includes, on both sides of each of the cutout portions 46 in the Y direction, a second plate side plate portion 48 at four locations, each of which is bent in the Z1 direction from both ends of the second plate portion 45 in the X direction. A joint plate portion 49 bent at a substantially right angle and extending outwardly in the X direction is provided at a distal end of each of the second plate side plate portions 48 in the Z1 direction.

As illustrated in FIGS. 3 and 4, the second plate 12 is configured in such a way that the joint plate portion 49 at four locations are abutted against the first plate portion 40 of the first plate 11. By fixing the abutment portions between the joint plate portions 49 and the first plate portion 40 by an adhesive agent, the second plate 12 is fixed to the first plate 11. The coil 10 is held between the first plate portion 40 of the first plate 11, and the second plate portion 45 of the second plate 12.

As illustrated in FIG. 5, the first plate 11 includes a notch portion 50 rising from the first plate portion 40 in the Z2 direction. The notch portion 50 is provided each at one location on each of the first plate flexure plate portions 42 in the Y2 direction. Each of the notch portions 50 is inclined in the X direction and in the Y direction, and comes into contact with the short side portion 10b of the coil 10 from an outer peripheral side (see FIG. 6). Herein, the first plate 11 has a linear symmetrical shape with respect to a virtual centerline L (see FIG. 6) passing through a middle of the first plate portion 40 in the X direction, and the two notch portions 50 are disposed at two symmetrical positions with respect to the virtual centerline L.

An arc-shaped cutout portion 143 is provided in an end edge of the power supply board 14 to be connected to the coil 10 in the Y2 direction. When the coil assembly 13 is assembled, first, the first substrate portion 141 of the power supply board 14 is positioned to an end of the first plate portion 40 of the first plate 11 in the Y1 direction, and fixed by an adhesive agent. Next, the coil 10 is positioned to the first plate 11. At this occasion, as illustrated in FIG. 6, the short side portion 10*b* of the coil 10 in the Y1 direction is fitted into the cutout portion 143 of the power supply board 14, and the short side portion 10*b* of the coil 10 in the Y2 direction is fitted into the two notch portions 50. This allows the coil 10 to be positioned in the Y direction. Also, by allowing the two notch portions 50 to come into contact with the short side portion 10*b* from both sides in the X direction, the coil 10 is positioned at a middle of the first plate 11 in the X direction.

Subsequently, a coil wire drawn from the coil 10 is connected to the power supply board 14. Then, when an adhesive agent is injected into the center hole 10*c* of the coil 10, and the second plate 12 is covered from the Z2 side, the coil 10 is fixed to the first plate 11 and the second plate 12 by the adhesive agent. Also, by abutting the joint plate portion 49 of the second plate 12 against the first plate portion 40 of the first plate 11, and fixing by the adhesive agent, the second plate 12 is fixed to the first plate 11. This allows an adhesive layer 15 made of cured adhesive agent to be defined in the center hole 10*c* of the coil 10 (see FIGS. 2 and 7). The long side portion 10*a* of the coil 10 is covered by the first plate flexure plate portion 42 and the second plate flexure plate portion 47 from the X1 direction and the X2 direction.

As illustrated in FIGS. 3 and 4, a pair of first plate side plate portions 43 each extending in the Z1 direction is provided at an end of the coil assembly 13 in the Y1 direction, and at an end of the coil assembly 13 in the Y2 direction. The coil assembly 13 is assembled to the first case member 31 by inserting the pair of first plate side plate portions 43 into the first case side plate portion 34 provided on the first case member 31 while flexing the pair of first plate side plate portions 43 inwardly.

Figure 10:
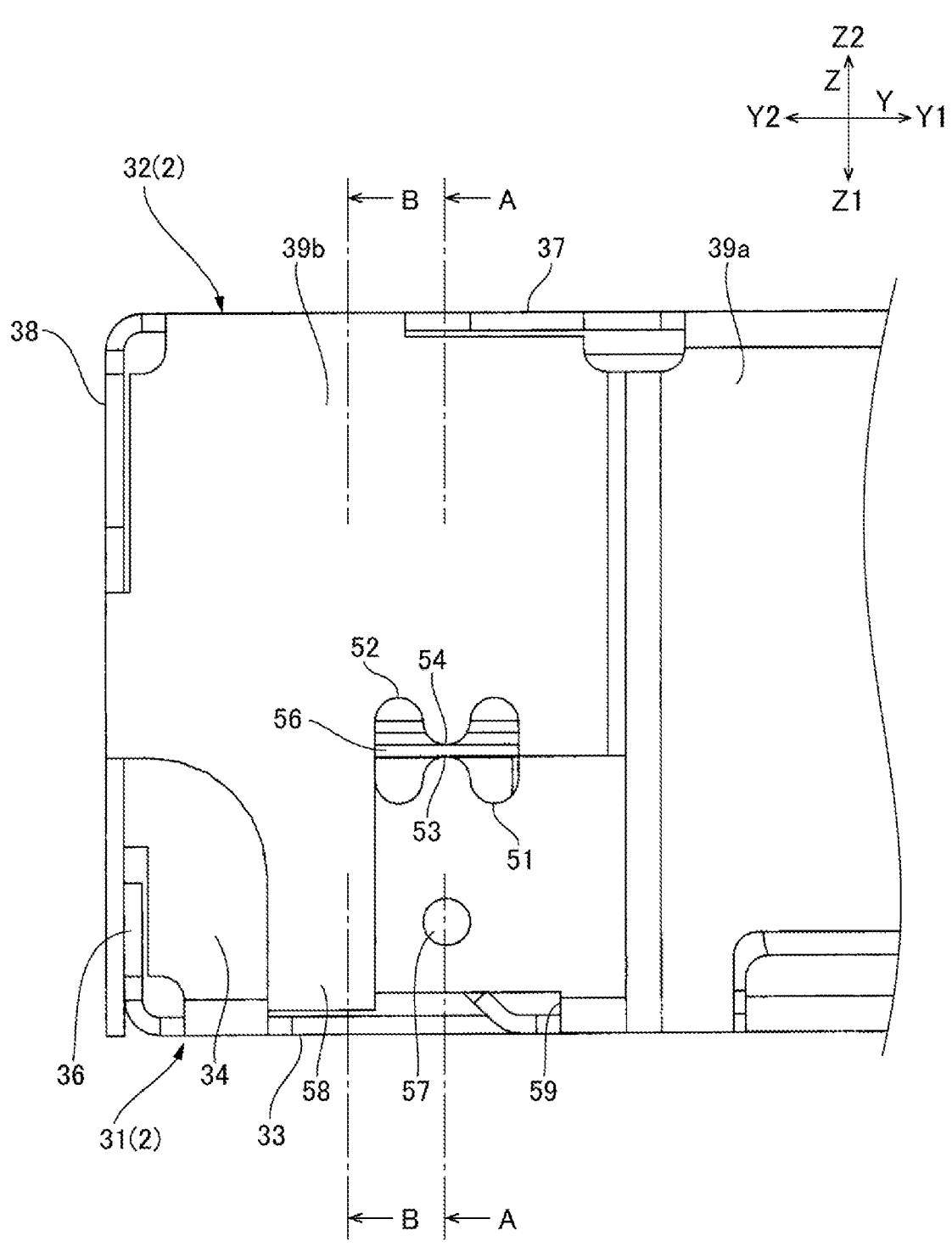
FIG. 10 is a partial enlarged view of a side surface of the actuator.
Figure 11:
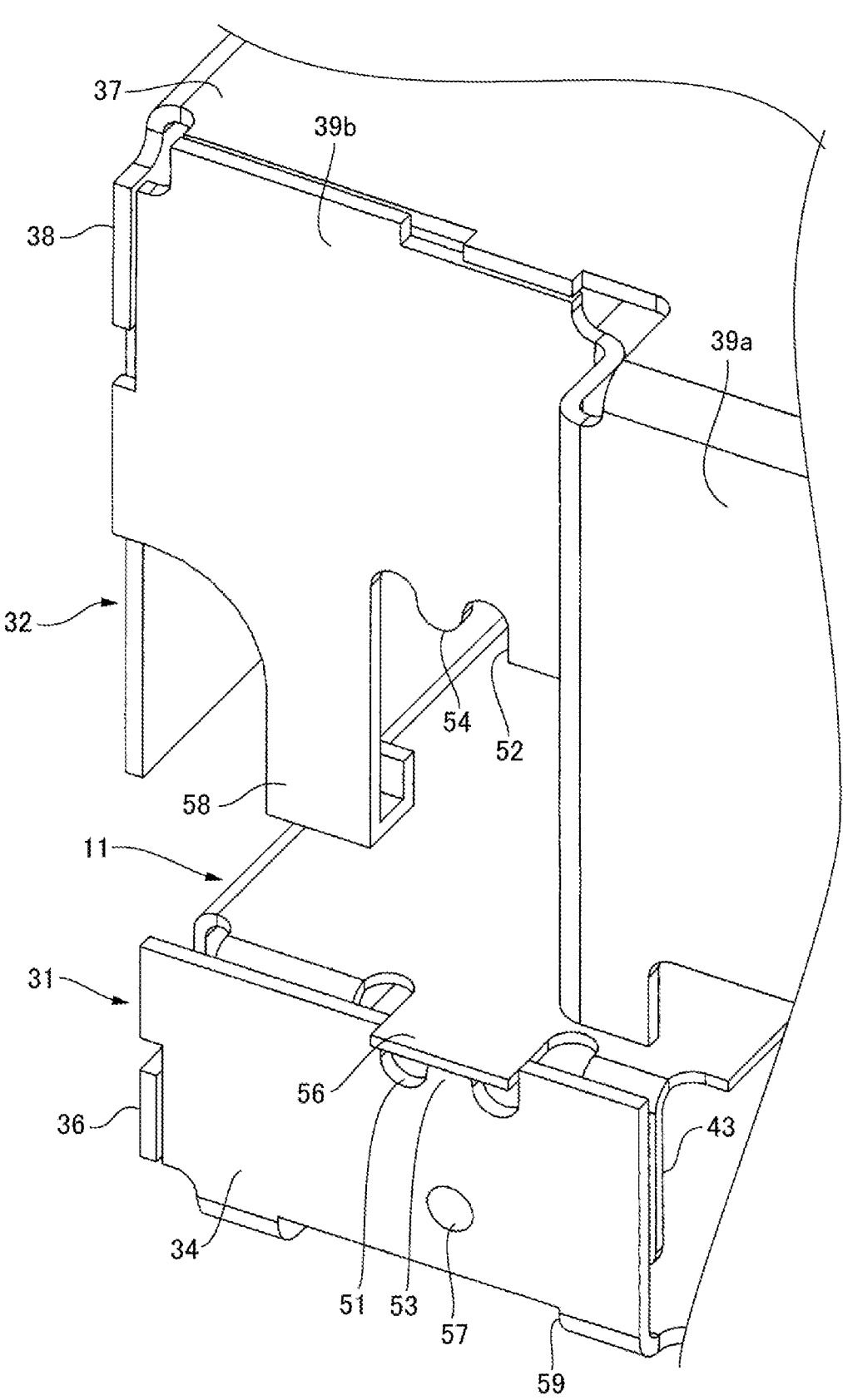
FIG. 11 is a perspective view of a first cutout concave portion, a second cutout concave portion, and a protruding plate portion.
Figure 12:
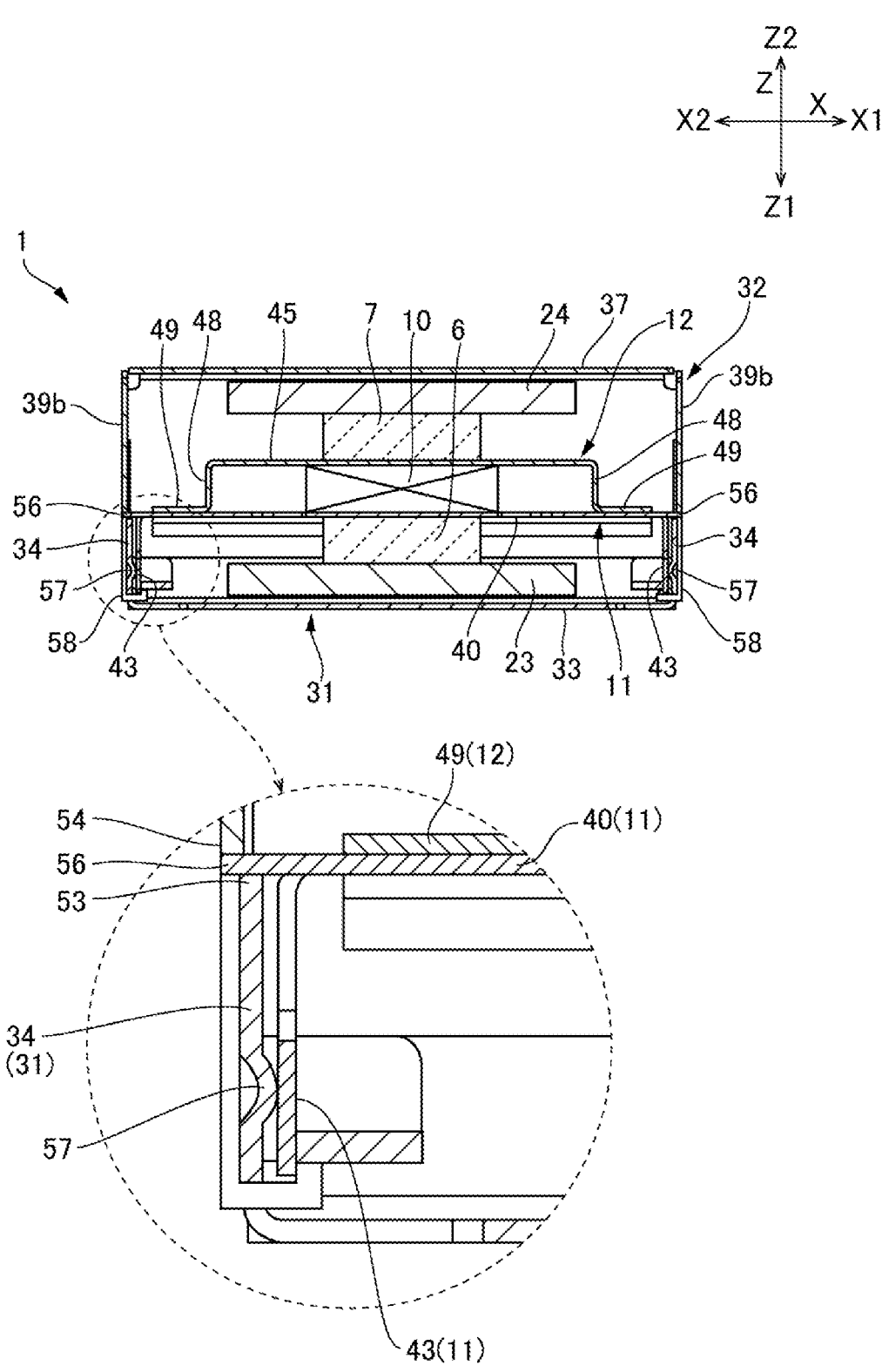
FIG. 12 is a cross-sectional view (cross-sectional view taken along the line A-A in FIG. 10) of the actuator when taken along a position where a case and the first plate are abutted against each other in a Z direction.
Figure 13:
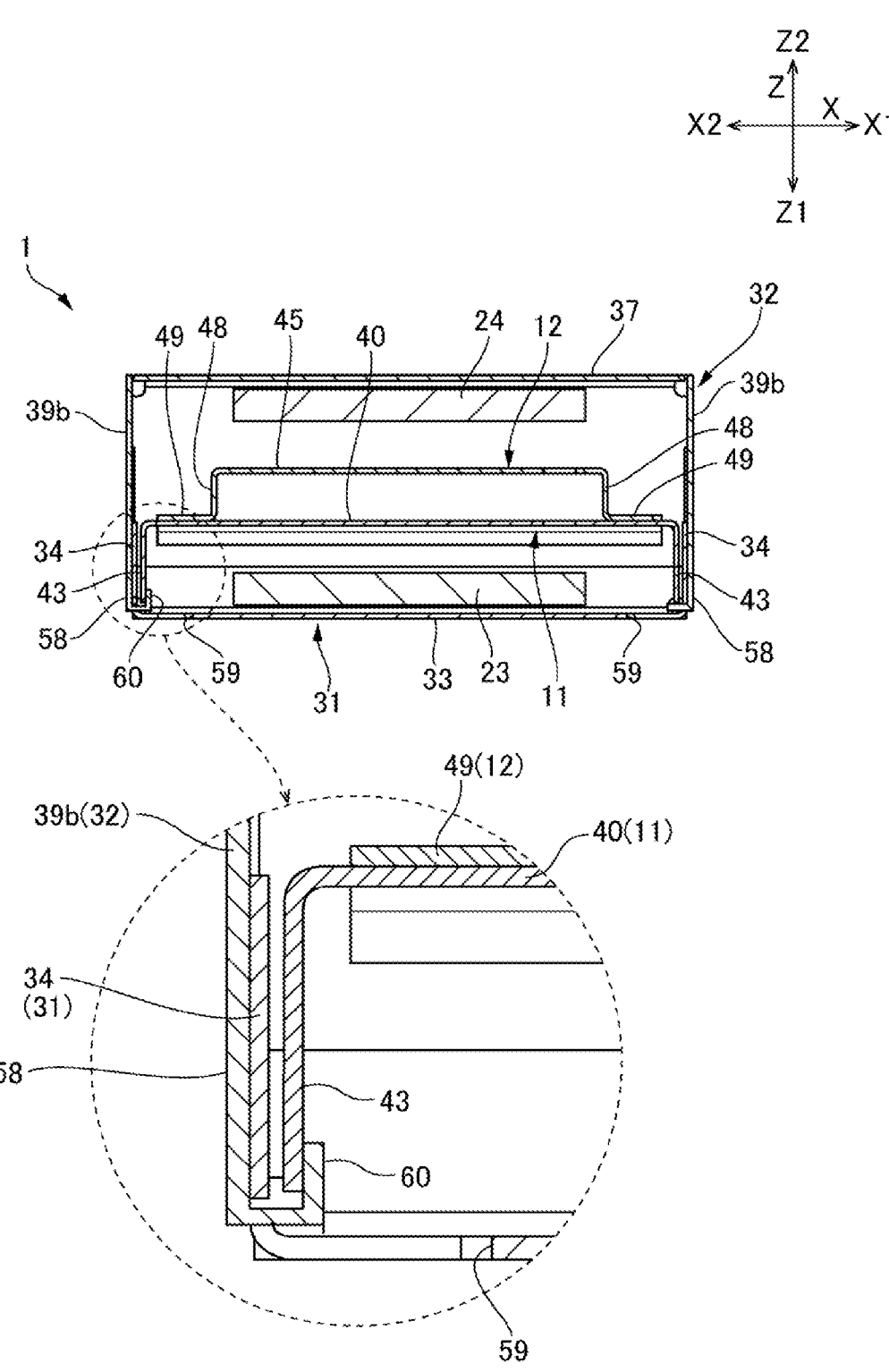
FIG. 13 is a cross-sectional view (cross-sectional view taken along the line B-B in FIG. 10) of the actuator when taken along a position where a hook of a second case member is engaged with a first case member and the first plate.

FIG. 10 is a partially enlarged view of a side surface of the actuator 1, and FIG. 11 is a perspective view of a first cutout concave portion 51, a second cutout concave portion 52, and a protruding plate portion 56. FIGS. 12 and 13 are cross-sectional views of the actuator 1. FIG. 12 is a cross sectional view (cross-sectional view taken along the line A-A in FIG. 10) taken along a position where the case 2 and the first plate 11 are abutted against each other in the Z direction, and FIG. 13 is a cross-sectional view (cross-sectional view taken along the line B-B in FIG. 10) taken along a position where the hook 58 of the second case member 32 is engaged with the first case member 31 and the first plate 11.

As illustrated in FIGS. 3 and 4, the first case member 31 includes the first cutout concave portion 51 at four locations, each of which is defined by cutting out, in the Z1 direction, an end edge of the first case side plate portion 34 in the Z2 direction. Also, the second case member 32 includes the second cutout concave portion 52 at four locations, each of which is defined by cutting out, in the Z2 direction, an end edge of the side plate end portion 39*b* in the Z1 direction. The second cutout concave portion 52 has a shape such that the first cutout concave portion 51 is provided upside down in the Z direction, and faces the first cutout concave portion 51 in the Z direction.

As illustrated in FIGS. 10 and 11, a first curved portion 53 protrudes in the Z2 direction from a middle in the Y direction at an edge of the first cutout concave portion 51 in the Z1 direction. A distal end of the first curved portion 53 has an arc shape protruding in the Z2 direction. Likewise, a second curved portion 54 protrudes in the Z1 direction from a middle in the Y direction at an edge of the second cutout concave portion 52 in the Z2 direction. A distal end of the second curved portion 54 faces the distal end of the first curved portion 53, and has an arc shape protruding in the Z1 direction.

As illustrated in FIGS. 3, 4, and 5, in the first plate 11 constituting the coil assembly 13, each of the four first plate side plate portion 43 includes a rectangular plate opening portion 55, and a protruding plate portion 56 protruding from an edge of the plate opening portion 55 in the Z2 direction. The plate opening portion 55 extends to an edge of the first plate portion 40, and the protruding plate portion 56 is located flush with the first plate portion 40. Therefore, the first plate 11 is provided with a pair of protruding plate portions 56 protruding from the first plate portion 40 toward both sides in the X direction. The pair of protruding plate portions 56 are provided each at both ends of the first plate 11 in the Y direction.

When the coil assembly 13 is assembled to the first case member 31 from the Z2 direction as described above, the first plate side plate portion 43 is fitted into the first case side plate portion 34. At this occasion, as illustrated in FIGS. 11 and 12, the protruding plate portion 56 provided at an end of the first plate 11 in the X direction is abutted against an apex of the first curved portion 53 by fitting the protruding plate portion 56 from the Z2 direction into the first cutout concave portion 51 provided in an edge of the first case side plate portion 34 in the Z2 direction. This allows the coil assembly 13 to be positioned in the Y direction with respect to the first case member 31, and allows the coil assembly 13 to be positioned in the Z direction with respect to the first case member 31.

Subsequently, the second case member 32 is assembled to the first case member 31 from the Z2 direction. At this occasion, a distal end of the first case side plate portion 34 is inserted into the side plate end portion 39*b* facing in the X direction. Then, as illustrated in FIG. 11, the protruding plate portion 56 is abutted against an apex of the second curved portion 54 by fitting a distal end of the protruding plate portion 56 protruding outwardly in the X direction from the first cutout concave portion 51 of the first case member 31 into the second cutout concave portion 52 opened in the Z1 direction (see FIGS. 10 and 12). This allows the second case member 32 to be positioned in the Y direction via the first plate 11, and allows the second case member 32 to be positioned in the Z direction.

As illustrated in FIGS. 3 and 4, each of the four first case side plate portions 34 has a hemispherical case-side convex portion 57 protruding inwardly of the first case member 31 (toward the middle in the X direction) at a position in the Z1 direction with respect to the first cutout concave portion 51. The case-side convex portion 57 is defined, for example, by a semi-punching process. As illustrated in a partially enlarged view of FIG. 12, a distal end of the first plate side plate portion 43 fitted into each of the first case side plate portions 34 elastically comes into contact with an apex of the case-side convex portion 57.

As described above, the hook 58 extending in the Z1 direction is provided at four locations on the second case member 32, and a distal end of the hook 58 is bent at a substantially right angle, and extends toward the middle in the X direction. As illustrated in FIG. 4, a case opening portion 59 passing through a corner portion at which the first case side plate portion 34 and the first end plate portion 33 are connected is provided in the first case member 31, and a distal end of the four hooks 58, each of which is bent in the X direction, is inserted into the first case member 31 through the case opening portion 59.

As illustrated in the partially enlarged view of FIG. 13, inside each of the hooks 58, two plate members, namely, the first case side plate portion 34 and the first plate side plate portion 43 are disposed in such a way as to overlap in the X direction, and a distal end of the hook 58 inserted into the first case member 31 through the case opening portion 59 is engaged with a distal end of the first case side plate portion 34 and a distal end of the first plate side plate portion 43. As illustrated in FIG. 13, an engaged portion 60 bent in the Z2 direction is provided at a distal end of the two hooks 58, each of which is provided on a side surface of the case 2 in the X2 direction. The engaged portion 60 is engaged with a distal end of the first case side plate portion 34 in the Z1 direction, and a distal end of the first plate side plate portion 43 in the Z1 direction.

As illustrated in FIG. 2, the first connecting body 6 is disposed between the first yoke 23 and the first plate 11. The first connecting body 6 is constituted of two members having the same shape, and is interposed between an end portion of the first yoke 23 in the Y1 direction and an end portion of the first plate 11 in the Y1 direction, and between an end portion of the first yoke 23 in the Y2 direction and an end portion of the first plate 11 in the Y2 direction. As illustrated in FIG. 4, in the present embodiment, the first connecting body 6 has a rectangular parallelepiped shape extending in the X direction.

The second connecting body 7 is disposed between the second yoke 24 and the second plate 12. The second connecting body 7 is constituted of two members having the same shape, and is interposed between an end portion of the second yoke 24 in the Y1 direction and an end portion of the second plate 12 in the Y1 direction, and between an end portion of the second yoke 24 in the Y2 direction and an end portion of the second plate 12 in the Y2 direction. In the present embodiment, the second connecting body 7 has the same shape as that of the first connecting body 6. The first connecting body 6 and the second connecting body 7 are compressed in the Z direction between the support body 3 and the movable body 5.

The first connecting body 6 and the second connecting body 7 are gel-like members made of silicone gel. Silicone gel is a viscoelastic material whose spring constant when deformed in an expansion/contraction direction is about three times the spring constant when deformed in a shear direction. When deformed in a direction (shear direction) intersecting a thickness direction, the viscoelastic material is deformed in a stretched direction by being pulled. Therefore, the viscoelastic material has deformation characteristics whose linear component is larger than a nonlinear component. Further, when the viscoelastic material is compressively deformed by being pressed in a thickness direction, the viscoelastic material has elasticity characteristics whose non-linear component is larger than a linear component, and when the viscoelastic material is stretched by being pulled in a thickness direction, the viscoelastic material has elasticity characteristics whose linear component is larger than a non-linear component.

Alternatively, for the first connecting body 6 and the second connecting body 7, various rubber materials such as natural rubber, diene rubber (e.g., styrene butadiene rubber, isoprene rubber, butadiene rubber, chloroprene rubber, acrylonitrile butadiene rubber, etc.), non-diene rubber (e.g., butyl rubber, ethylene propylene rubber, ethylene propylene diene rubber, urethane rubber, silicone rubber, fluoro rubber, etc.), and thermoplastic elastomers, and their modified materials may be used.

When current in a predetermined direction is supplied to the coil 10 via the power supply board 14, the movable body 5 supported by the support body 3 moves relative to the support body 3 in one of the X directions by a driving force of the magnetic drive circuit 8. Thereafter, when the direction of the current is reversed, the movable body 5 moves relative to the support body 3 in the other direction of the X directions. By repeatedly reversing a direction of current to be supplied to the coil 10, the movable body 5 vibrates.

As described above, the actuator 1 according to the present embodiment includes the movable body 5, the support body 3 provided with the case 2 that houses the movable body 5, connecting bodies (the first connecting body 6 and the second connecting body 7) to be connected to the movable body 5 and the support body 3, and the magnetic drive circuit 8 including the coil 10 and the magnet 16 facing the coil 10 in the Z direction (first direction), and vibrating the movable body 5 with respect to the support body 3 in the X direction (second direction) intersecting the Z direction (first direction). The support body 3 includes the metal first plate 11 that overlaps the coil 10 from the Z1 direction (one side in the first direction), and the coil 10 is fixed to the case 2 via the first plate 11. The coil 10 is an air-core coil including the pair of long side portions 10a aligned in the X direction (second direction), and the pair of short side portions 10b that connect the pair of long side portions 10a. The first plate 11 includes the notch portion 50 (positioning portion) that positions the coil 10 in a direction intersecting the Z direction (first direction) by coming into contact with the coil 10 from an outer peripheral side.

According to the present embodiment, the coil 10 is fixed to the case 2 via a metal plate. Since the plate includes the notch portion 50 that positions the coil 10, a resin coil holder, which has been conventionally used, can be eliminated, and the coil 10 can be accurately positioned solely by the plate. Since the metal plate does not need to be thick in order to secure strength, as compared with a resin component, the coil 10 can be made large. Therefore, an acceleration of the movable body 5 can be increased, and large vibrations can be generated without increasing an external size of the actuator 1. In addition, the number of components can be reduced, and the number of assembly processes can be reduced by eliminating a resin component.

In the present embodiment, the notch portion 50 comes into contact with the short side portion 10b of the coil 10 from an outer peripheral side. Since the long side portion 10a of the oval-shaped coil 10 tends to expand toward the outer peripheral side during manufacturing, the short side portion 10b has higher shape accuracy than that of the long side portion 10a. Therefore, by bringing the short side portion 10b into contact with the notch portion 50 (positioning portion), positioning accuracy of the coil 10 can be improved.

In the present embodiment, the short side portion 10b has an arc shape, and the notch portion 50 is disposed at two locations symmetrical in the X direction (second direction) with respect to the virtual centerline L extending in the Y direction at a middle of the short side portion 10b in the X direction (second direction). In this way, by disposing the notch portion 50 (positioning portion) at two locations in the diagonal direction of the coil 10, instead of disposing the notch portion 50 (positioning portion) at an apex of the short side portion 10b, it is possible to leave a space on both sides of the oval-shaped coil 10 in the longitudinal direction. Therefore, by disposing the connecting bodies (the first connecting body 6 and the second connecting body 7) that connect the movable body 5 and the support body 3 in this space, it is possible to avoid interference of the connecting bodies with the notch portion 50.

Note that, the arrangement of the notch portion 50 is not limited to the arrangement of the present embodiment. For example, as a configuration of the actuator 1, in a case where a configuration in which a connecting body is disposed between the first yoke 23 and the first end plate portion 33, and between the second yoke 24 and the second end plate portion 37 is adopted, there is no need to secure a space for disposing a connecting body on the first plate 11. Therefore, a configuration in which the notch portion 50 is disposed at an apex of the short side portion 10*b* may be adopted.

In the present embodiment, the support body 3 includes the power supply board 14 to be fixed to the first plate 11, the power supply board 14 includes the cutout portion 143 into which either one of the pair of short side portions 10*b* fits, and the notch portion 50 comes into contact with the other of the pair of short side portions 10*b* from the outer peripheral side. In this way, by utilizing the power supply board 14 for positioning, the number of the notch portions 50 can be reduced. Therefore, the shape of the first plate 11 can be simplified.

Note that, in a case where the power supply board 14 is not disposed on the first plate 11, but is fixed to the case 2, the power supply board 14 cannot be utilized for positioning the coil 10. Therefore, in this case, it is possible to adopt a configuration in which the notch portion 50 comes into contact with both of the short side portions 10*b* from the outer peripheral side, instead of coming into contact with one of the short side portions 10*b*.

In the present embodiment, a positioning portion that positions the coil 10 is a notch portion rising from the first plate portion 40 of the first plate 11 in the Z2 direction (the other side in the first direction). Since the notch portion 50 can be easily defined during manufacturing of the first plate 11, it is possible to avoid an increase in the component cost of the first plate 11. Note that, the positioning portion may be a configuration other than the notch portion 50. For example, the positioning portion may be an embossed portion protruding in the Z2 direction.

In the present embodiment, the support body 3 includes the metal second plate 12 that overlaps the coil 10 from the Z2 direction (the other side in the first direction), and the adhesive layer 15 that is filled in at least the center hole 10*c* of the coil 10, and fixes the coil 10 to the first plate 11 and the second plate 12. Thus, by disposing the notch portion 50 at a different position from the center hole 10*c*, which is filled with an adhesive agent, it is possible to prevent or suppress the adhesive agent from leaking between the first plate 11 and the second plate 12.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An actuator comprising:

a movable body;

a support body comprising a case that houses the movable body;

a connecting body to be connected to the movable body and the support body; and a magnetic drive circuit comprising a coil and a magnet facing the coil in a first direction, and vibrating the movable body with respect to the support body in a second direction intersecting the first direction, wherein the support body comprises a first plate that is made of metal and overlaps the coil from one side in the first direction, and the coil is fixed to the case via the first plate, the case comprising a first case member and a second case member, the first case member comprising a first cutout concave portion and the second case member comprising a second cutout concave portion facing the first cutout concave portion, the coil is an air-core coil comprising a pair of long side portions aligned in the second direction, and a pair of short side portions that connect the pair of long side portions, and the first plate comprises a positioning portion that positions the coil in a direction intersecting the first direction by coming into contact with the coil from an outer peripheral side, wherein the first plate further comprises a protruding plate portion that fits into both the first and second cutout concave portions to thereby position the first plate with respect to the case.

2. The actuator according to claim 1, wherein the positioning portion comes into contact with at least either one of the pair of short side portions from the outer peripheral side.

3. The actuator according to claim 1, wherein the pair of short side portions has an arc shape, and the positioning portion is disposed at two locations symmetrical in the second direction with respect to a middle of the pair of short side portions in the second direction.

4. The actuator according to claim 2, wherein the support body comprises a power supply board to be fixed to the first plate, and the power supply board comprises a cutout portion into which one of the pair of short side portions fits, and the positioning portion comes into contact with the other of the pair of short side portions from the outer peripheral side.

5. The actuator according to claim 1, wherein the positioning portion is a notch portion rising toward the other side in the first direction.

6. The actuator according to claim 1, wherein the support body comprises a second plate that is made of metal and overlaps the coil from the other side in the first direction, and an adhesive layer that is filled in at least a center hole of the coil, and fixes the coil to the first plate and the second plate.

7. The actuator according to claim 1, wherein the first cutout concave portion comprises a first curved portion protruding toward the second case member, and the second cutout concave portion comprises a second curved portion protruding toward the first case member and facing the first curved portion, and the protruding plate portion is in contact with at least one of the first curved portion and the second curved portion.

8. The actuator according to claim 1, wherein the second case member comprises a hook extending toward the first case member, and the first case member comprises a case opening portion, and a distal end of the hook is inserted through the case opening portion and engaged with both the first case member and the first plate.

* * * * *